United States Patent [19]

Fukuoka

[11] Patent Number: 5,363,506
[45] Date of Patent: Nov. 8, 1994

[54] INFORMATION PROCESSOR WITH DELAYED INTERRUPT DEVICE

[75] Inventor: Katsuhito Fukuoka, Yokohama, Japan

[73] Assignee: Kabushiki Kaisha Toshiba, Kawasaki, Japan

[21] Appl. No.: 137,762

[22] Filed: Oct. 19, 1993

Related U.S. Application Data

[63] Continuation of Ser. No. 729,028, Jul. 12, 1991, abandoned.

[30] Foreign Application Priority Data

Jul. 17, 1990 [JP] Japan .................. 2-187256

[51] Int. Cl.$^5$ ............................. G06F 9/46
[52] U.S. Cl. .................. 395/725; 364/242.1; 364/242.2; 364/271.5; 364/DIG. 1
[58] Field of Search ............. 395/725, 275, 375, 425

[56] References Cited

U.S. PATENT DOCUMENTS

| | | | |
|---|---|---|---|
| 4,271,468 | 6/1981 | Christensen et al. | 395/275 |
| 4,398,247 | 8/1983 | Bazlen et al. | 395/375 |
| 4,564,903 | 1/1986 | Guyette et al. | 395/425 |
| 4,748,587 | 5/1988 | Combes et al. | 395/575 |
| 4,843,541 | 6/1989 | Bean et al. | 395/725 |
| 4,862,352 | 8/1989 | Moyer et al. | 395/725 |
| 5,029,069 | 7/1991 | Sakamura | 395/375 |

OTHER PUBLICATIONS

Musashino Electrical Communication Lab., NTT, Musashino, Japan, "Electronics and Communications in Japan", vol. 57, No. 4, pp. 18–26, Apr. 1974.

Primary Examiner—Gopal C. Ray
Attorney, Agent, or Firm—Foley & Lardner

[57] ABSTRACT

An information processor with a delayed interrupt device, comprises: a status register for storing information indicating whether or not a delayed interrupt process is processible; an execution unit for executing a normal instruction, a delayed interrupt request instruction, and a delayed interrupt process according to a delayed interrupt request that is based on the delayed interrupt request instruction; and an interrupt request unit for storing the delayed interrupt request transferred from the execution unit and sending the same to the execution unit. The interrupt request unit comprises a delayed interrupt request storage unit involving a plurality of storage portions for storing a plurality of delayed interrupt requests; a pointer for pointing one of the storage portions such that each delayed interrupt request is stored in the order of occurrence; and a selector for selecting one of the storage portions that is storing the oldest one of the delayed interrupt requests stored in the storage portions. Upon receiving an interrupt request from the interrupt request unit, the execution unit executes, according to the contents of the status register, a delayed interrupt process corresponding to the interrupt request.

4 Claims, 2 Drawing Sheets

INFORMATION PROCESSOR WITH DELAYED INTERRUPT DEVICE

This application is a continuation of application Ser. No. 07/729,028, filed Jul. 12, 1991, now abandoned.

BACKGROUND OF THE INVENTION

1. Field of the Invention

This invention relates to an information processor with a delayed interrupt device having a function of delaying the processing of an interrupt request until a predetermined condition is satisfied, if the interrupt request such as a delayed interrupt request to be executed has occurred during the execution of another process, and processing the interrupt request after the completion of another process.

2. Description of the Prior Art

Among processes to be executed in an information processor, there is a process that must be completed with no interruption, once it is started. This kind of process is called an indivisible process and hereinafter referred to as the process P. The process P is, for example, a process that must be completed within a defined time, or a read/write process or an accessing process that handles a certain object R such as a specific region in a memory or a specific I/O device.

There are three types of the interrupt processes, an external interrupt request, a software interrupt request, and a delayed interrupt request.

During the execution of the process P, an external interrupt request of executing another process I may occur. Since it is impossible to execute the process I at once, the request of process I is stored, and after the completion of the process P, the process I is executed. Namely, the interrupt process I is delayed.

To delay the process I, the information processor usually has a delayed interrupt function.

FIG. 1 is a block diagram roughly explaining the delayed interrupt function of the information processor.

In the figure, the information processor 21 has an instruction execution unit 25 for reading programs from a memory 23 and successively processing the read programs. Among processes to be executed by the instruction execution unit 25, there is time indivisible process P.

If the instruction execution unit 25 detects, during the execution of the process P, certain condition to issue a request of executing another process I, the instruction execution unit 25 sends a delayed interrupt request 201 to a delayed interrupt memory circuit 27, instead of executing the process I at once. The delayed interrupt memory circuit 27 stores the request.

A delayed interrupt signal generator 29 generates a delayed interrupt signal 203 according to the data stored in the delayed interrupt memory circuit 27. The signal 203 is transferred to time instruction execution unit 25 through a delayed interrupt inhibition circuit 31.

The delayed interrupt inhibition circuit 31 does not issue an interrupt signal 205 if a status register 33 of the instruction execution unit 25 contains a value D indicating that time process P is being executed, and if the same contains a value E indicating that the process P is not being executed, issues the interrupt signal 205 corresponding to time delayed interrupt signal 203 to the instruction execution unit 25.

The instruction execution unit 25 keeps the value D in the status register 33, while executing the process P. If the status register 33 is holding the value D, therefore, the delayed interrupt inhibition circuit 31 does not provide the interrupt signal 205. After the completion of the process P, the instruction execution unit 25 changes the contents of the status register 33 to the value E indicating that the process P is not being executed. The delayed interrupt inhibition circuit 31 then generates the interrupt signal 205, and upon receiving the interrupt signal 205, the instruction execution unit 25 suspends a presently executing process and starts executing the process I.

A conventional information processor having the delayed interrupt function will be explained with reference to a block diagram of FIG. 2.

In the figure, the information processor, represented with numeral 21, has a 4-bit register 35 called a delayed interrupt (DI), which stores any one of numerals H'0 to H'f. Here, H' means that the following numeral is a hexadecimal numeral.

An instruction execution unit 25 of the information processor 21 has a 4-bit register 37 called IMASK, which stores any one of numerals H'0 to H'f. When the numeral stored in the DI 35 is smaller than the numeral stored in the IMASK 37, a comparator 39 sends the contents of the DI 35 as an interrupt signal 205 to the instruction execution unit 25, and according to the signal 205, the instruction execution unit 25 executes an interrupt process.

Usually, the IMASK 27 and DI 35 store each H'f. A process I is registered in the instruction execution unit 25 as an interrupt process corresponding to an interrupt signal H'e. Before executing the process P, the instruction execution unit 25 sets the IMASK 37 to, for example, H'e that is smaller than H'f. The content of the IMASK 37 is reset again to H'f after the completion of the process P.

If the process I to be executed occurs during the execution of the process P, the instruction execution unit 25 does not execute the process I at once but writes H'e in the DI 35 with a delayed interrupt request 201. At this time, the numeral stored in the DI 35 is not smaller than the numeral stored in the IMASK 37, so that the comparator 39 does not issue the interrupt signal 205.

After completing the process P, the instruction execution unit 25 sets H'f in the IMASK 37. The numeral stored in the DI 35 then becomes smaller than the numeral stored in the IMASK 37, and therefore, the comparator 39 sends the contents H'e of the DI 35 as the interrupt signal 205 to the instruction execution unit 25. Upon receiving the signal 205, the instruction execution unit 25 suspends a presently executing process and executes the interrupt process I corresponding to the interrupt signal H'e.

This conventional information processor 21 does not execute the interrupt process of the process I during the execution of the process P but stores the request of executing the process I as the delayed interrupt request 201 to delay the execution of the process I until the process P is completed.

The information processor 21, however, can store only one delayed interrupt request 201. In the above example, for example, if another interrupt request corresponding to a numeral H'd is to be stored in the DI 35 while the DI 35 is holding the numeral H'e as the delayed interrupt request 201, the previously stored numeral H'e will be abandoned. As a result, the execution request of the process I will be lost. In this way, this information processor 21 cannot store a plurality of delayed interrupt requests.

Another conventional information processor will be explained with reference to FIG. 3.

This information processor, represented with numeral 21, has a register 41, which comprises 15 bits numbered from H'1 to H'f.

An instruction execution unit 25 of the information processor 21 has a 4-bit register 37 (referred to as the IMASK 37), which stores any one of numerals H'0 to H'f.

A priority encoder 43 provides a smallest one of bit numbers of the register 41 where H'1 is stored.

A comparator 39 compares the bit number provided by the priority encoder 43 with a numeral stored in the IMASK 37, and if the former is larger than the latter, provides the former bit number as an interrupt signal 205 to the instruction execution unit 25. Upon receiving the interrupt signal 205, the instruction execution unit 25 executes the interrupt process.

Usually, the IMASK 37 stores H'0, and each bit of the register 41 stores 0. The process I is registered in the instruction execution unit 25 as all interrupt process corresponding to a signal H'8. Before executing the process P, the instruction execution unit 25 sets the IMASK 37 to a value larger than H'8, for example, H'f.

If a request of the process I to be executed occurs during the execution of the process P, the instruction execution unit 25 does not execute the process I at once but writes H'1 in the "H'8"th bit of the register 41. This writing process is carried out with a delayed interrupt request 201. At this time, an output 203 of a priority encoder 43 is H'8, which is not larger than the numeral stored in the IMASK 37, so that the comparator 39 does not generate the interrupt signal 205.

After the completion of the process P, the instruction execution unit 25 sets H'0 in the IMASK 37. At this time, the output of the priority encoder 43 becomes larger than the contents of the IMASK 37, and therefore, the comparator 39 supplies the output H'8 of the priority encoder 43 as the interrupt signal 205 to the instruction execution unit 25. Upon receiving the signal 205, the instruction execution unit 25 executes the interrupt process I corresponding to the interrupt signal H'8.

The information processor 21 stores up to 16 execution requests. In the above example, the "H'8"th bit of the register 41 used for the execution request of the process I. To further store an execution request of another process J, the process J may be registered in advance in the information processor 21 as an interrupt process corresponding to, for example, an interrupt signal H'9. When the delayed interrupt request 201 is issued for the process J, a numeral H'1 will be written in the "H'8"th bit of the register 41. If the numeral stored in the IMASK 37 becomes smaller than H'8, an interrupt request corresponding to the "H'8"th bit of the register 41 is generated to execute the process I, and when the numeral stored in the IMASK 37 becomes smaller than H'9, an interrupt request corresponding to the "H'9"th bit of the register 41 is generated to execute the process J.

According to this information processor 21, the delayed interrupt request 201 is stored in the register 41, then processed in an ascending order of bit numbers, irrespective of the order of generation of each request. Further, each bit of the register 41 stores only one corresponding delayed interrupt request 201. For example, if two requests occur for the process I and if a value H'1 is written two times in the "H'8"th bit of the register 41, this makes no sense.

In this way, the conventional information processor of FIG. 2 stores only a single delayed interrupt request to execute the same after a certain delay time, and cannot store a plurality of delayed interrupt requests. On the other hand, the conventional information processor of FIG. 3 stores a plurality of delayed interrupt requests but cannot store the order of occurrence of the delayed interrupt requests and cannot repeatedly store the same delayed interrupt request.

SUMMARY OF THE INVENTION

To solve these problems, an object of the invention is to provide an information processor having a delayed interrupt device that stores a plurality of interrupt requests and executes them in the order of occurrence.

In order to accomplish the object, the invention provides an information processor with a delayed interrupt device, comprising: a status register for storing information indicating whether or not a delayed interrupt process is processible; an execution means for executing a normal instruction, a delayed interrupt request instruction, and a delayed interrupt process according to a delayed interrupt request that is based on the delayed interrupt request Instruction; and an interrupt request means for storing the delayed interrupt request transferred From the execution means and sending the same to the execution means.

The interrupt request means comprises a delayed interrupt request storage means involving a plurality of storage portions for storing a plurality of delayed interrupt requests, a pointer for pointing one of the storage portions such that each delayed interrupt request is stored in the order of occurrence, and a selector for selecting one of the storage portions that is storing the oldest one of the delayed interrupt requests stored in the storage portions.

Upon receiving an interrupt request from the interrupt request unit, the execution unit executes, according to the contents of the status register, a delayed interrupt process corresponding to the interrupt request.

in this way, the invention stores a plurality of delayed interrupt requests In the delayed interrupt request storage unit, and executes them in the order of occurrence.

DETAILED DESCRIPTION OF THE EMBODIMENTS

Embodiments of the invention will be explained with reference to the drawings.

First Embodiment

Figure 1:
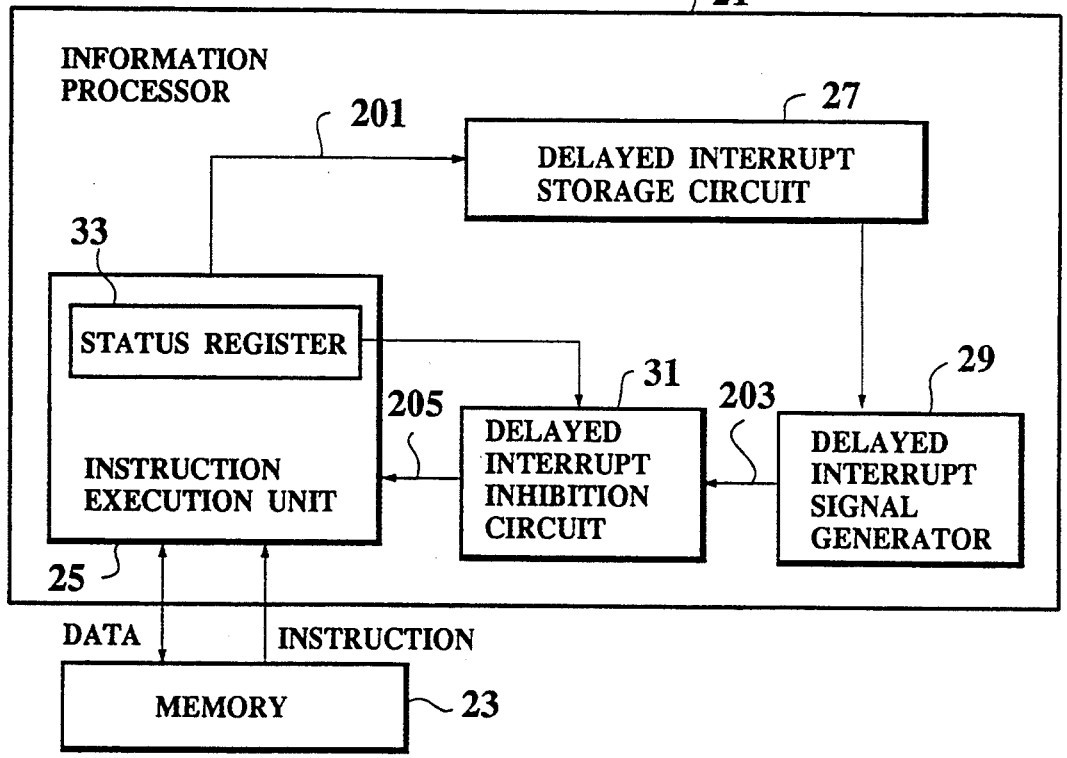
FIG. 1 is a block diagram showing a conventional information processor with a delayed interrupt device.
Figure 2:
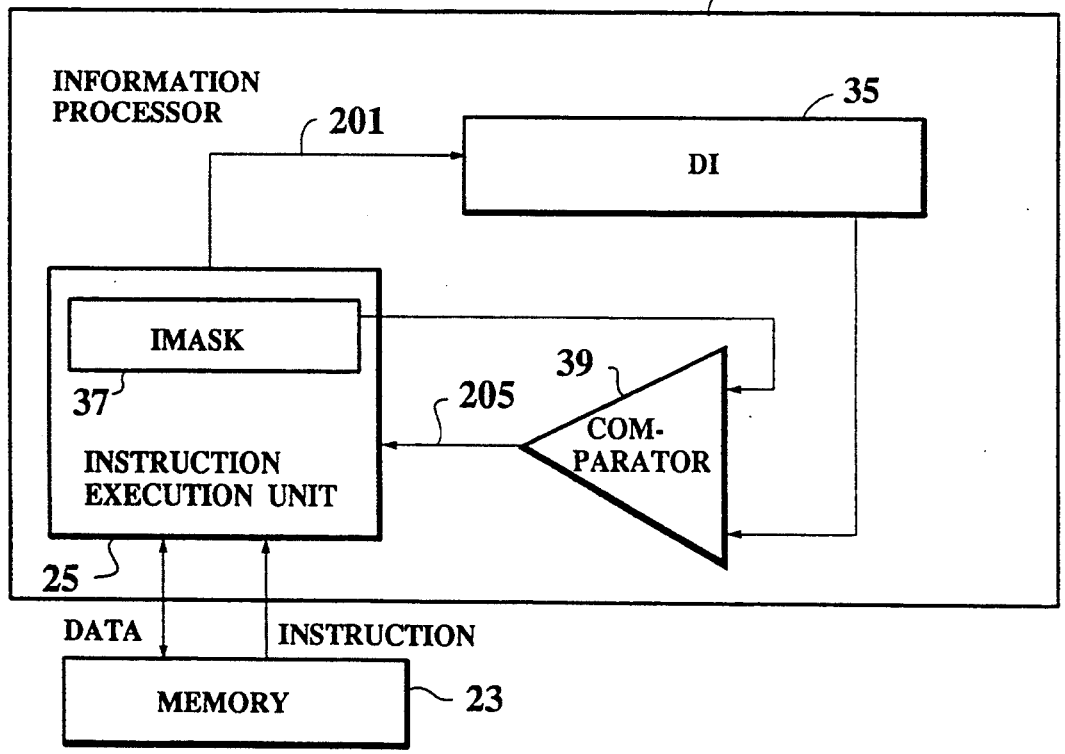
FIG. 2 is a block diagram showing another conventional information processor with a delayed interrupt device.
Figure 3:
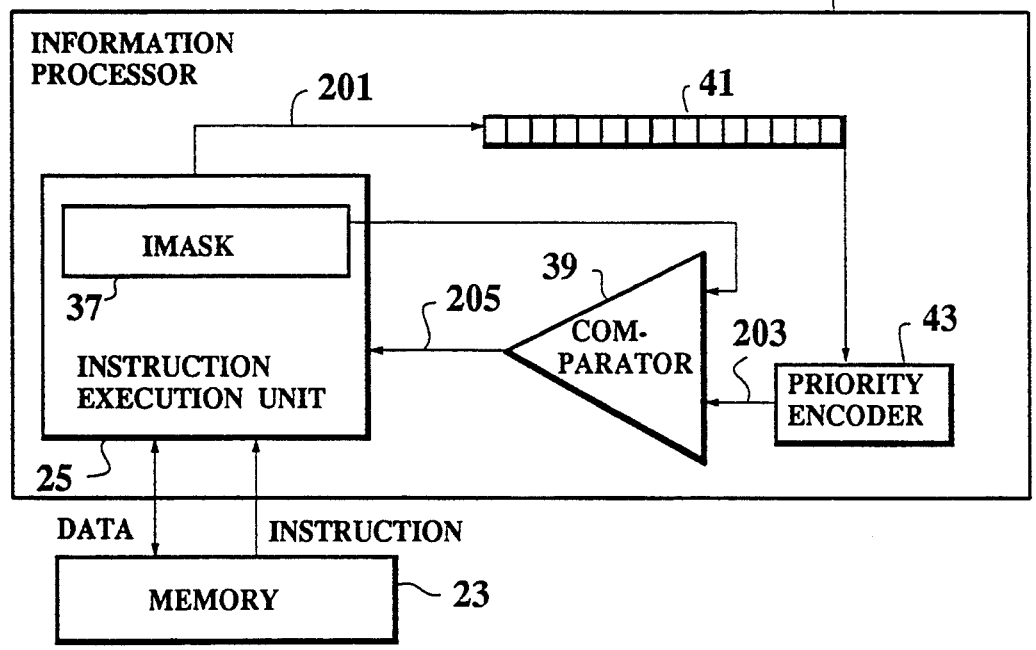
FIG. 3 is a block diagram showing still another conventional information processor with a delayed interrupt device.
Figure 4:
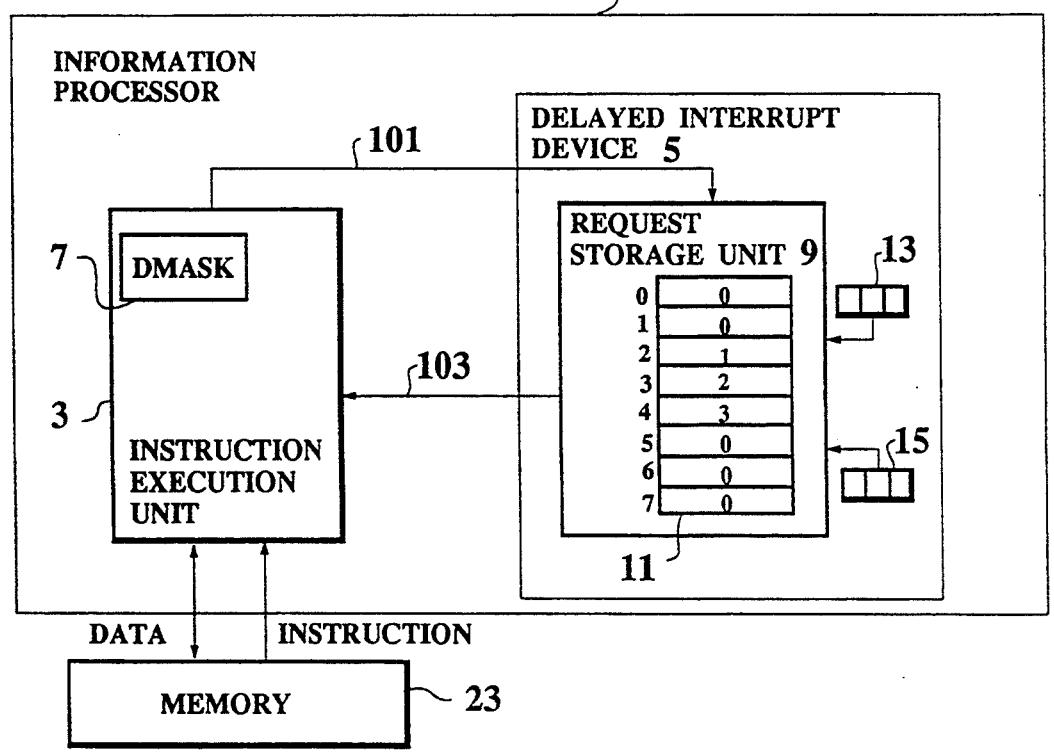
FIG. 4 is a block diagram showing an information processor with a delayed interrupt device according to the invention.

FIG. 4 is a block diagram showing an information processor according to a first embodiment of the invention.

The information processor 1 has an instruction execution unit 3 and a delayed interrupt device 5. The instruction execution unit 3 handles three types of interrupts, i.e., an external interrupt, a software interrupt, and a delayed interrupt in addition to an ordinary instruction.

The instruction execution unit 3 defines one external interrupt handler E1 that is a program activated by the external interrupt. The instruction execution unit 3 defines one software interrupt handler SI that is a program activated by the software interrupt, The instruction execution unit 3 has a TRAP instruction to cause the software interrupt.

The instruction execution unit 3 further defines three delayed interrupt bandlets (not shown) I1, I2, and I3 each being a program activated by the delayed interrupt.

The instruction execution unit 3 has a one-bit register DMASK 7, which stores one of H'0 and H'1 where H'0 indicates a delayed interrupt authorized state and H'1 a delayed interrupt inhibition state.

The instruction execution unit 3 sets the DMASK 7 H'1 when activating any one of the delayed interrupt handlers I1, I2 and I3.

The instruction execution unit 3 has a REIT instruction. During the execution of the interrupt handler, the instruction execution unit 3 may execute the REIT instruction to return to a state before the execution of the interrupt handler, as well as returning the DMASK 7 to a value before the execution of the interrupt handler, thereby continuing a process before the start of the interrupt handler.

If it Is required to execute the delayed interrupt handler I1, the instruction execution unit 3 sends delayed interrupt request signal 101 of H'1 to the delayed interrupt device 5. Similarly, the instruction execution unit 3 sends a delayed interrupt request signal 101 of H'2 for the delayed interrupt handler I2, and H'3 for the delayed interrupt handler I3 to the delayed interrupt device 5.

The delayed interrupt device 5 has a request storage unit 9 having eight storage elements 11. The request storage unit 9 stores delayed interrupt requests. The delayed interrupt device 5 also has a first pointer 13 as a selector which indicates the oldest stored storage element and a free pointer 15 which points out an unstored storage. element. These pointers comprise each three bits to store any one of numerals H'0 to H'7, and their initial values are each H'0.

An operation of the information processor of the first embodiment will be explained.

Upon receiving the delayed interrupt request signal 101, the delayed interrupt device 5 writes the value of the delayed interrupt signal 101 in one of the storage elements 11 of the request storage unit 9 pointed out by the free pointer 15, and at the same time, adds H'1 to the free pointer 15. If the value of the free pointer 15 is H'7, it becomes H'0 after the addition of H'1.

If there is a difference between the values of the first pointer 13 and free pointer 15, the delayed interrupt device 5 determines that at least one delayed interrupt request is stored in the request storage unit 9, and therefore, generates a delayed interrupt request signal according to the contents of one of the storage elements 11 of the request storage unit 9 pointed out by the first pointer 13, and provides the delayed interrupt signal 103 to the instruction execution unit 3. If the DMASK 7 is holding a value of H'1, the instruction execution unit 3 ignores the delayed interrupt signal 103 and continues a presently executing process, and if the DMASK 7 is holding a value of H'0, the instruction execution unit 3 accepts the delayed interrupt request signal 103 and activates one of the delayed interrupt handlers I1, I2 and I3 corresponding to the delayed interrupt request signal 103.

If the instruction execution unit 3 accepts the delayed interrupt request signal 103, the delayed interrupt device 5 adds H'1 to the contents off the first pointer 13. If the first pointer 13 contains H'7, it becomes H'0 after the addition of H'1.

The DMASK 7 usually holds H'0. When the DMASK 7 is holding H'0 and the instruction execution unit 3 sends a delayed interrupt request signal 101 of H'1, the delayed interrupt device 5 sends a delayed interrupt request signal 103 of H'1. The instruction execution unit 3, therefore, activates the delayed interrupt handler I1, I2, or I3 at once.

If the instruction execution unit 3 has accepted an interrupt request and is executing one of the interrupt handlers, the DMASK 7 must be H'1. Accordingly, the instruction execution unit 3 ignores the delayed interrupt request signal 103. After the information processor 1 executes the REIT instruction to set H'0 in the DMASK 7, the instruction execution unit 3 accepts the delayed interrupt request signal 103. In this way, while the instruction execution unit 3 is executing any one of the interrupt handlers, a delayed interrupt request is delayed.

While one delayed interrupt request is being delayed due to the DMASK 7 of H'1, the instruction execution unit 3 may send another delayed interrupt request signal 101 to the delayed interrupt device 5. In this case, the delayed interrupt device 5 can store eight of delayed interrupt requests in the request storage unit 9.

When the request storage unit 9 stores a plurality delayed interrupt requests, the oldest one of the stored requests is sent out as the delayed interrupt request signal 103. The oldest delayed interrupt request is processed, therefore, as soon as the DMASK 7 is set to H'0 with the REIT instruction. The other requests stored in the request storage unit 9 are delayed until the present delayed interrupt handler is completely executed and the REIT instruction is again executed.

As explained above, the first embodiment of the invention stores up to eight of delayed interrupt requests in the delayed interrupt device 5, delays their execution until an interrupt handler now being executed in the instruction execution unit 3 is completed, and executes the stored interrupt requests one by one after the completion of the interrupt handler now being executed.

Second Embodiment

According to the first embodiment, the DMASK 7 comprises one bit. The second embodiment employs a DMASK 7 comprising a plurality of bits. The other parts of the second embodiment are the same as those of the first embodiment.

The instruction execution unit 3 of the information processor 1 of the second embodiment sets the DMASK 7 to H'1 if the instruction execution unit 3 is executing the delayed interrupt handler I1, to H'2 for the delayed interrupt handler I2, and to H'3 for the delayed interrupt handler I3.

A delayed interrupt request 101 provided by the instruction execution unit 3 is stored in the delayed interrupt device 5, similar to the first embodiment. The delayed interrupt device 5 generates a delayed interrupt request signal 103. Only when a value represented with the delayed interrupt request signal 103 is smaller than a value stored in the DMASK 7, the instruction execution unit 3 accepts the delayed interrupt request signal 103.

For example, when the instruction execution unit 3 accepts a delayed interrupt request signal 103 of H'3 and activates the delayed interrupt handler I3, the DMASK 7 is set to H'3. If the delayed interrupt device 5 is holding H'2 as the next interrupt request, the delayed interrupt device 5 generates a delayed interrupt request signal 103 of H'2. Since this value H'2 is smaller than the value stored in the DMASK 7, the instruction execution unit 3 accepts the delayed interrupt request signal 103 of H'2, and then activates the delayed interrupt handler I2. As a result, the previously activated delayed interrupt handler I3 is suspended and will be executed after the completion of the delayed interrupt handler I2 and the execution of the REIT instruction.

In this way, the information processor 1 of the second embodiment may activate the delayed interrupt handler I2 during the execution of the interrupt handler I3, but delay the execution of the interrupt handler I3 during the execution of the interrupt handler I2.

Namely, the information processor 1 of the second embodiment gives priority to delayed interrupt handlers.

Third Embodiment

The third embodiment of the invention is basically the same as the first embodiment but employs a memory as a part of the request storage unit 9.

The memory includes a logic ring buffer, or a queue storage region. The data structure of the memory optional if the delay interrupt device 5 can store delayed interrupt requests in the order of their occurrence.

Since the memory has a wide storage region, it can store many delayed interrupt requests.

As explained above, the invention provides an information processor that stores delayed interrupt requests occurred during the operation of the information processor in the order of occurrence, and sequentially executes the stored interrupt requests in the order of occurrence.

What is claimed is:

1. An information processor having a delayed interrupt device, said information processor comprising:

execution means for executing a delayed interrupt request instruction, said execution means generating a delayed interrupt request in order to delay an execution of a delayed interrupt process specified by said delayed interrupt request instruction until conditions are established, said execution means including a status register for storing information indicating whether an interrupt process can be executed by said execution means; and interrupt request means for storing said delayed interrupt request transferred from said execution means and for sending said delayed interrupt request back to said execution means to commence interrupt processing, said interrupt request means including a delayed interrupt request storage unit which includes a plurality of storage portions for storing a plurality of delayed interrupt requests transferred from said execution means in a first-in/first-out manner, and selecting means for selecting one of said plurality of delayed interrupt requests stored in said delayed interrupt request storage unit and for sending a delayed interrupt request selected by said selecting means back to said execution means; and wherein said status register stores a value indicating whether an interrupt process corresponding to a delayed interrupt request sent from said interrupt request means can be executed, and wherein said execution means executes the interrupt process corresponding to the delayed interrupt request when said status register indicates that conditions for executing said delayed interrupt request are established.

2. An information processor as recited in claim 1, wherein said status register consists of a one bit register.

3. An information processor as recited in claim 1, wherein said status register consists of a register having a plurality of bits, and an execution priority of said delayed interrupt process is determined by the contents of said status register.

4. An information processor as recited in claim 1, wherein said delayed interrupt request storage unit is arranged in a RAM disposed inside said information processor.

* * * * *